United States Patent [19]

Spirk

[11] 4,151,790

[45] May 1, 1979

[54] COFFEE MAKER FOR VEHICLES

[75] Inventor: David J. Spirk, Pittsburgh, Pa.

[73] Assignee: Jean English, Chagrin Falls, Ohio

[21] Appl. No.: 813,486

[22] Filed: Jul. 7, 1977

[51] Int. Cl.$^2$ ............................................. A47J 31/56
[52] U.S. Cl. ........................................ 99/281; 99/305; 99/283
[58] Field of Search ............... 219/322, 323, 327, 328; 126/374, 389; 99/280, 281, 282, 302 R, 283

[56] References Cited

U.S. PATENT DOCUMENTS

| | | | |
|---|---|---|---|
| 2,846,938 | 8/1958 | Brandl | 99/281 |
| 2,926,234 | 2/1960 | Palmer | 99/305 |
| 3,371,592 | 3/1968 | Remy | 99/282 |
| 3,446,937 | 5/1969 | Hugentobler | 99/281 |
| 3,691,933 | 9/1972 | Martin | 99/282 |
| 4,039,771 | 8/1977 | Thorsoe | 99/281 |

Primary Examiner—Robert W. Jenkins
Attorney, Agent, or Firm—Oldham, Oldham, Hudak & Weber

[57] ABSTRACT

The coffee maker includes a reservoir and a heating chamber, having a vent tube, connected to the reservoir for receiving water therefrom, a heater for the heating chamber, and a coffee making area connected to the heating chamber. A control means is operated by a limited rise of temperature in the heating chamber to close the vent tube. A starter switch to control power supply to the coffee maker and a thermostatically controlled shut-off means is provided to open the starter switch and shut off power to the coffee maker when the heating chamber has no water therein and excessive temperatures are being realized in such heating chamber.

A modified coffee maker eliminates the vent tube closure and provides for releasing a small quantity of water to a heating area and repeatedly heating small volumes of water for pumping action to discharge to a coffee making area, the invention also covering such method of making coffee by repeated heatings of small confined volumes of water to steam producing temperatures.

5 Claims, 14 Drawing Figures

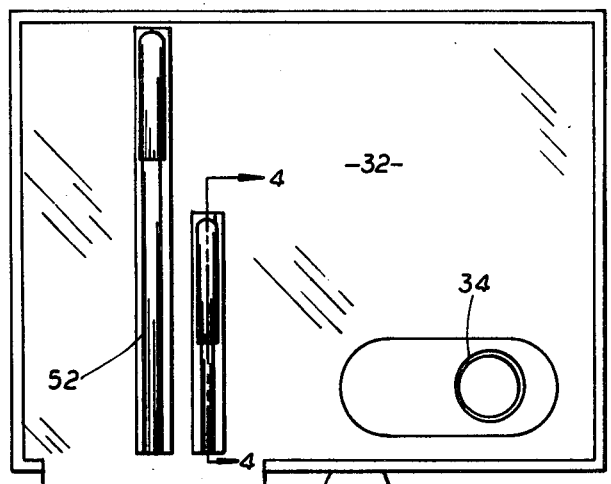
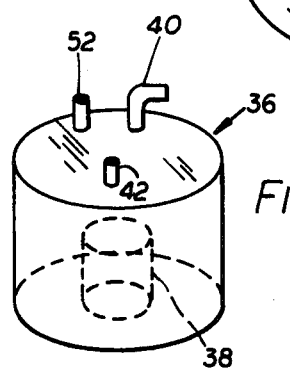
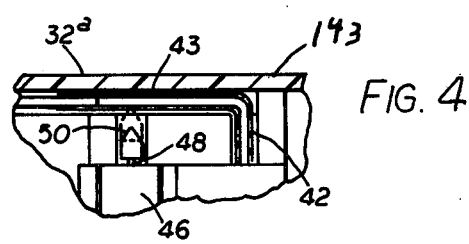
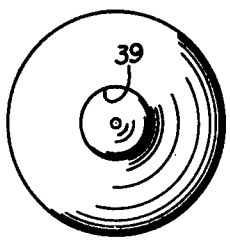
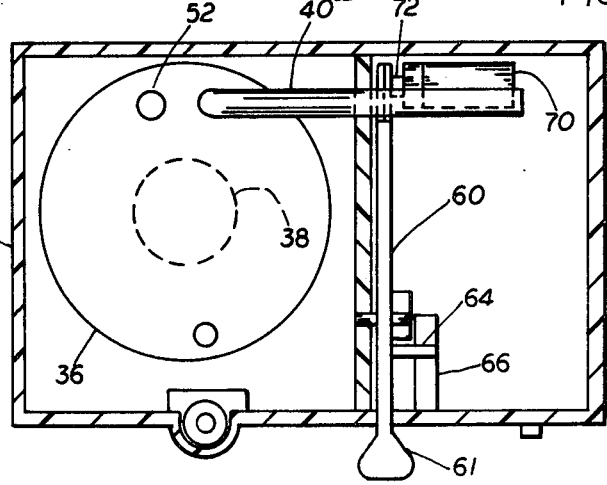

COFFEE MAKER FOR VEHICLES

BACKGROUND OF INVENTION

Heretofore there have been many different types of coffee makers provided and a number of various types of automatic coffee makers have been made and sold commercially in large quantities. The present invention relates especially to coffee makers for use in vehicles to facilitate providing hot coffee to the vehicle occupants. Insofar as I am aware, some coffee maker accessories have been provided heretofore for vehicles such as the liquid heater shown in U.S. Pat. No. 3,231,713 and another heater unit as shown in U.S. Pat. No. 2,661,015. These heaters have not been completely satisfactory as they do not perform the full automatic coffee making process. Also, all of these automatic coffee makers as provided heretofore have been somewhat sizable, or they have involved a number of rather expensive components, or the coffee makers have not been of sturdy construction and of compact size, or the coffee makers have not been easy to operate and control when in use, or they may have been objectionable for other reasons.

In view of the foregoing, it is the general object of the present invention to provide a novel and improved automatic coffee maker for a vehicle and especially to one having a built in reservoir and controls to provide an automatic coffee brewing cycle.

Another object of the invention is to utilize a movable starter control member to close an electrical energy supply circuit for the coffee maker and at the same time to control or prevent flow of water from a reservoir area into a heating chamber in the apparatus when the apparatus is energized.

Another object of the invention is to utilize positive acting electrical controls in an automatic coffee maker for automatically making a quantity of hot water in the vehicle and dispensing it to a coffee making and providing area.

Yet another object of the invention is to provide a relatively uncomplicated, inexpensive automatic coffee maker for use in a vehicle and to provide practical, efficiently operating electrical controls for the coffee maker and the functioning thereof so that hot coffee can be easily and readily provided to the vehicle operator or passengers.

Another object of the invention is to provide an apparatus for making coffee and wherein a continuously open tube vents back into the water reservoir and wherein water is released from a storage reservoir for flow to a predetermined volume closed container and then when the unit is actuated, to release small quantities from the confined volume storage chamber to a localized heating tube for steaming and pumping action to move the water up to a coffee making area.

Another object of the invention is to simplify and reduce the size of a heating area in the coffee producer, and to provide a simplified electrical control circuit for the coffee maker.

Yet another object of the invention is to reduce the cost of the coffee maker and components thereof and to provide a positive method of operation of the coffee maker.

Another object of the invention is to provide a method of making coffee providing the steps of releasing small volumes of water from a storage chamber, heating the water in a localized portion of the apparatus and preventing its return flow to the confined volume storage chamber, and pumping the heated water to a coffee making area for discharge therein by pressure generated in the heating area in such confined volume of water.

The foregoing and other objects and advantages of the present invention will be made more apparent as the specification proceeds.

Attention now is particularly directed to the accompanying drawings wherein:

FIG. 3 is a plan view of the coffee maker of FIG. 1 with the cover strips of the coffee maker housing removed;

FIG. 4 is a fragmentary vertical section taken on line 4—4 of FIG. 3 with the cover strip shown in place;

FIG. 5 is a plan view, partially in diagrammatic form, of the coffee maker of FIG. 1 with the reservoir section removed;

FIG. 7 is a perspective view of the heating chamber member of the invention;

FIG. 8 is a bottom plan of the heating chamber of FIG. 7;

When referring to corresponding members shown in the drawings and referred to in the specification, corresponding numerals are used to facilitate comparison therebetween.

SUBJECT MATTER OF INVENTION

The coffee maker of the invention, as one embodiment thereof, includes a reservoir, a heating chamber of smaller liquid capacity than the reservoir, a water supply line connecting the reservoir to the heating chamber, and a heater for the heating chamber, a coffee making area being present and wherein the coffee maker is characterized by a combination including a control or starter switch for power supply to the coffee maker and to the heater, water in the heating chamber being heat pumped out of the same to flow to the coffee making area when sufficient temperature is realized in the heating chamber, and a thermostatically controlled shut-off means to actuate the starter switch and turn off power to the coffee maker when the heating chamber reaches an excessive predetermined temperature. The coffee maker also may include a vent tube for the heating chamber and a thermostatically operated means to close the vent tube at a predetermined temperature. The coffee maker also comprises the control switch having a movable spring contact means therein, a starter lever arm pivotally positioned in the coffee maker for contacting the spring contact means and closing the control switch, a flexible water supply tube connecting the reservoir to the heating chamber, and wherein the lever arm, when operative, closes the water supply tube to prevent further water supply to the heating chamber from the reservoir during the heating cycle.

A modified coffee maker of the invention provides for heating the coffee making water in small volumes by repeated heating and discharge actions rather than heating the entire contents of a heating chamber at one time and the method of making the coffee by such intermittent batch heating of water volumes is a portion of the invention.

Figure 10:
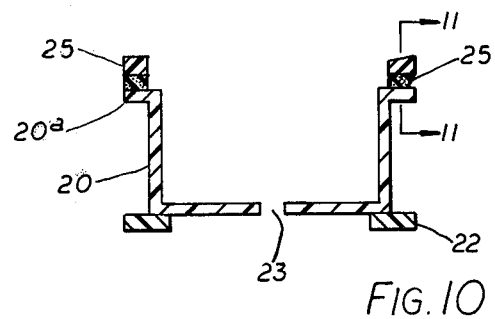
FIG. 10 is a vertical section through a portion of the housing of FIG. 9.
Figure 11:
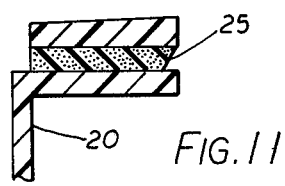
FIG. 11 is a fragmentary vertical section taken on line 11—11 of FIG. 10.

With reference to the details of the construction shown in the drawings, a coffee maker is indicated as a whole by the numeral 10. This coffee maker includes a frame or housing 12 that preferably includes two laterally outwardly extending edge flanges 14 at its upper edge. These flanges 14 can be received in suitable slotted recesses provided in a vehicle dash whereby the coffee maker would be operatively mounted in a vehicle for use. The unit is shown with slide contacts 16 thereon and they connect to a suitable power supply, normally the vehicle battery, to provide energy required for coffee production by the coffee maker 10. Such power connection can be made in any conventional manner by any known means. The coffee maker 10 preferably includes a coffee making area or zone 18 which may comprise an open topped slide container or filter cup 20 that is removably positioned on a platform 22, FIG. 10, protruding forwardly from an adjacent portion of the frame 12. This container 20 can have a suitable coffee filter, or a package of coffee in a filter, etc. received therein whereby hot water released onto the slide container 20 and the contents thereof flows downwardly through the coffee, etc. in the container and through an aperture 23 in its bottom for discharge into a container 24 positioned below this platform. This container or cup 24 normally is carried by a stirrup or holder 26 pivotally supported from a lower portion of the platform to carry the cup thereon.

Preferably the container 20 is in sealed engagement with the platform 22 and associated members including an annular flange 25 on the housing and directly above the platform. The container 20 has an upper annular or continuous flange 20a thereon and a small knob or rib 21 protruding forwardly of the container to facilitate grasping and moving the slide container. Suitable means such as a resilient gasket 25 is carried on the flange 20a to seal between the flanges 25 and 20a as the container is slid onto the platform 22 and turned through a small arc. The flanges 20a and 25 have adjacent surfaces one of which is inclined towards the other to achieve this seal on a short clockwise arc movement of the container.

The coffee maker 10 of the invention is adapted to provide storage for a quantity of liquid therein, and thus an enclosed reservoir 30 is formed at the upper part of the frame 12 and the top 32 of the frame may form a portion of the reservoir.

The coffee maker has a heating chamber or unit 36 which is a closed generally cylindrical container. A conventional cylindrical electric heater 38 is received in a cylindrical recess 39 in the bottom of the heating chamber 36. Such heater 38 is controlled as hereinafter described.

For operation of the coffee maker, the heating chamber 36 has a water supply, fitting, or inlet tube 40, usually metal, connecting to a top portion of the heating chamber and extending laterally of the coffee maker by a resilient tube 40a over to and suitably connecting to the bottom of the reservoir 30 for flow of water from the reservoir to the heating chamber by gravity, when required.

The reservoir 30 is of any suitable construction to form an enclosure and it usually has a recess extending up in its lower surface in which the tube 40a is received. Water is supplied to the reservoir 30 as through a removable closure or cap 34 and, by inverting the apparatus, water will flow from the reservoir to drain the same, if desired. The reservoir may be a separate tank.

The heating chamber 36 also has a vent tube 42 suitably connecting thereto and extending upwardly therefrom. The vent tube 42 has a horizontally extending upper end section 43 of resilient construction, adapted to be shut off when the heating chamber reaches a predetermined temperature, that extends forwardly in the apparatus as best shown in FIGS. 3 and 4 of the drawings. A top plate 143 is removably positioned above the tube 43. A control thermostat 44 is provided in any suitable operative association with the heating chamber 36 to measure its temperature and, when a predetermined temperature is reached in the chamber or its contents, this thermostat closes to energize a solenoid 46 positioned in a forward upper portion of the apparatus and controlling a solenoid armature 48. The armature then is moved forcibly vertically upwardly in the apparatus. A little wedge block 50 is positioned on the upper end of the armature. Such wedge block 50 is slidably held in the apparatus frame for vertical movement and is positioned immediately below the horizontally extending resilient section 43 of the vent tube 42 to be moved thereagainst to seal such vent tube against the lower surface of the reservoir top 32 when the solenoid 46 is energized.

Thereafter, continued heating of the liquid in the heating chamber 36 will ultimately cause the temperature and pressure thereof to reach a sufficiently high value that a heat pump action is provided for the liquid in the chamber to cause it to flow upwardly out of the heating chamber 36 through a discharge tube 52 of suitable construction connecting to the chamber and extending upwardly and then forwardly of the apparatus. Such tube 52 discharges water at its front end into the coffee or a coffee package positioned below the front end of the discharge tube that is directly above the platform 22 and the container 20 thereon.

Figure 1:
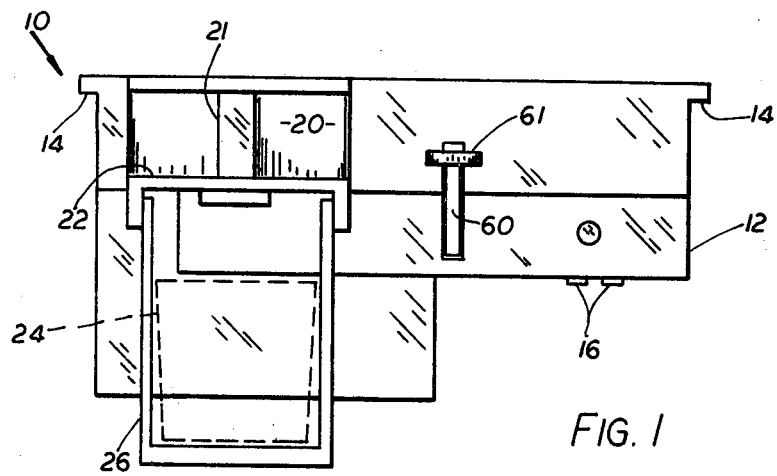
FIG. 1 is a front elevation of a coffee maker embodying the principles of the invention.
Figure 2:
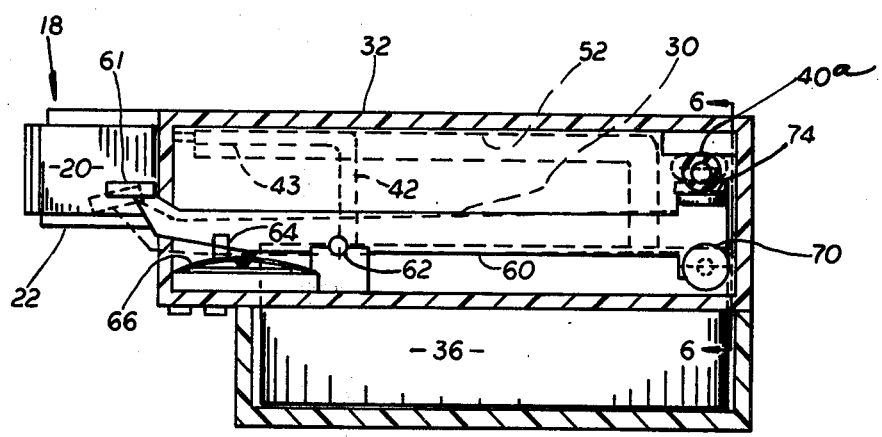
FIG. 2 is a right side elevation of the coffee maker of FIG. 1.
Figure 6:
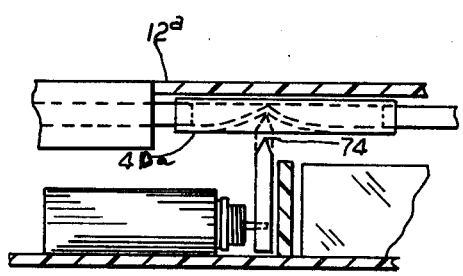
FIG. 6 is a fragmentary vertical section, taken on line 6—6 of FIG. 2, to show part of the starter lever arm and associated members.
Figure 9:
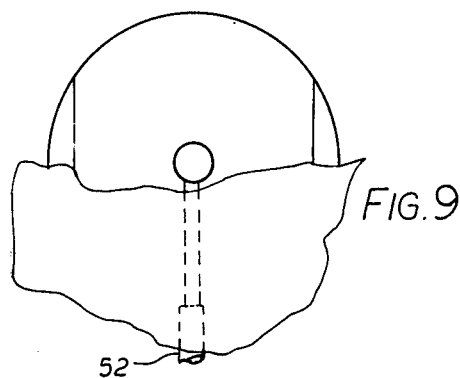
FIG. 9 is a fragmentary plan of the coffee making area and associated means in the apparatus.

A control circuit is provided for the coffee maker 10 and thus the contacts 16 connect to a power control circuit wherein a control or starter arm 60 is provided. This control arm 60 is pivotally positioned in the apparatus as by a support fulcrum 62, FIG. 2, intermediate its ends and with a forward portion or key 61 of this control arm protruding outwardly of the frame 12 of the coffee maker. The control arm 60 is pivoted downwardly at its front end to turn the coffee maker on. By such action, an extension 64 extending laterally from the arm contacts a spring arm 66 to move it to close a switch 68 operatively associated with this control arm 60 and connecting to and controlling the power circuit for the coffee maker. Thus, the power circuit is closed by the switch 68 and this actuates the heater 38 provided for the heating chamber 36. The switch 68 also supplies power to a series circuit of a normally open thermostat 80 positioned operatively near the heating chamber 36 and the coil of a solenoid 70 which is positioned with its axis extending transversely at the rear of the frame 12. This solenoid has an armature 72 which is spring activated to move axially outwardly of the solenoid when the coil is not energized so that the spring actuated armature 72 (spring not shown) protrudes outwardly from and is biased outwardly of the solenoid body to extend in under the rear end of or a shoulder on the fulcrum arm 60 when the forward end of the arm 60 is depressed. The solenoid 70, when unenergized, hence prevents downward movement of the rear end of the arm. This fulcrum arm 60 has a sharp upper rear end 74 that bears up against the resilient inlet tube 40a when the control arm or lever has been depressed at its front end to close the circuit to the switch 68. At that time, the end 74 pinches the resilient tube up against the cover 32 and closes the tube to prevent further flow of water from the reservoir to the heating chamber 36. Water flows to the chamber 36 when the coffee maker is turned off and flows up into the vent tube 42 to a height common with the reservoir 30. As stated before, the spring actuated armature 72 retains the end 74 of the arm 60 in operative tube closing position by moving in under a shoulder or part on the arm, but when the solenoid 70 is actuated near the end of a cycle, the armature 72 is drawn in to its coil and then the resiliency in the inlet tube 40 plus the spring action of the arm 66 in the switch 68 force this lever arm 60 downwardly. The thermostat 80 is closed at a temperature of about 190° F. in the heater chamber and this energizes the solenoid 70, releases the control arm 60 and opens the switch 68.

The predetermined high temperature, such as 190° F. for "shut off" action is reached in the heating chamber 36 after water has been expelled therefrom for the desired coffee making action.

In operation, the cup is placed in the holder 26 and the proper quantity of coffee is placed in the slide container or drawer 20 that is moved to its sealed position on the platform 22. As the switch 68 is not closed and the control arm 60 is inoperative, a quantity of liquid will have flowed from the reservoir 30 down into the heating chamber 36 to fill the same and its outlets to reservoir level. Further flow of water thereto then will stop. The vent tube 42 and outlet tube for the heating chamber extend upwardly to and usually above the top level of the reservoir to prevent water overflowing after the heating chamber is filled. Then when the front end of the control arm 60 is depressed, further flow of water to the heating chamber 36 is prevented, and the water therein is heated by the electric heater 38. As the temperature of the water in the chamber 36 is raised, the thermostat 44 closes and the solenoid 46 is energized to close the vent tube 42. Then continued heat supply to the water in the heating chamber raises it to a temperature of about 170° to 175° F. at which time the closed heating chamber will function as a heat pump to force the water out of the heating chamber through the discharge tube 52. This causes the hot water to flow through the coffee in the filter cup which may have a slight pressure therein to provide the desired cup of coffee. Next, continued heating raises the temperature in the heating chamber 36 to a predetermined high level, about 190° F., at which time the solenoid 70 is actuated by the closing of the thermostat 80, the control arm 60 moves to inoperative position and water is permitted to flow from the reservoir 30 down into the heating chamber 36 to fill the same. Now the apparatus is ready for another cycle of operation when a new supply of coffee is placed in the filter cup 20 for coffee making action when the control arm 60 is next depressed.

A freeze preventing heater circuit may be provided by a heater 90 in a power circuit controlled by a thermostat 92 that is set to open above 40° F. and to close at temperatures therebelow. Also, an indicator light 94 is present in the circuit to show operative heating conditions. The heater 90 may be an elongated wire that is positioned below the reservoir 30, the chamber 36, and also extends along the connecting tube 41 and vent tube 42.

Figure 13:
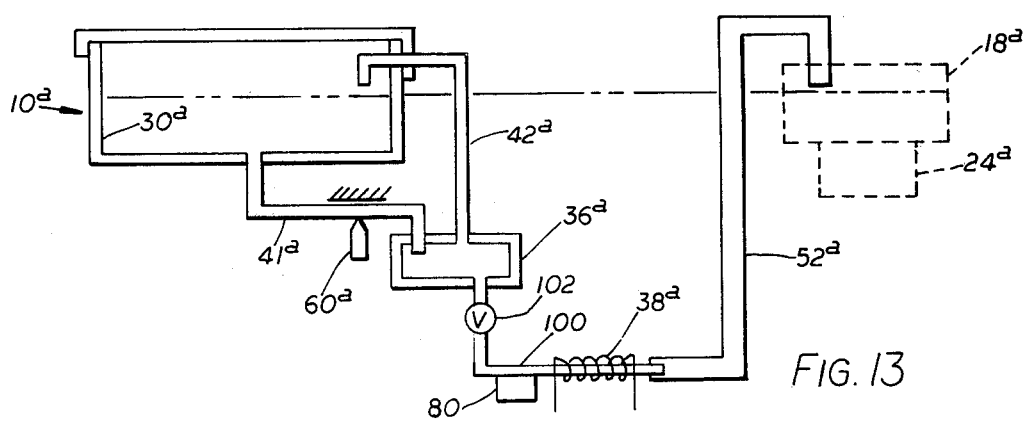
FIG. 13 is a diagrammatic view of apparatus comprising a modification of the coffee making apparatus of the invention.
Figure 12:
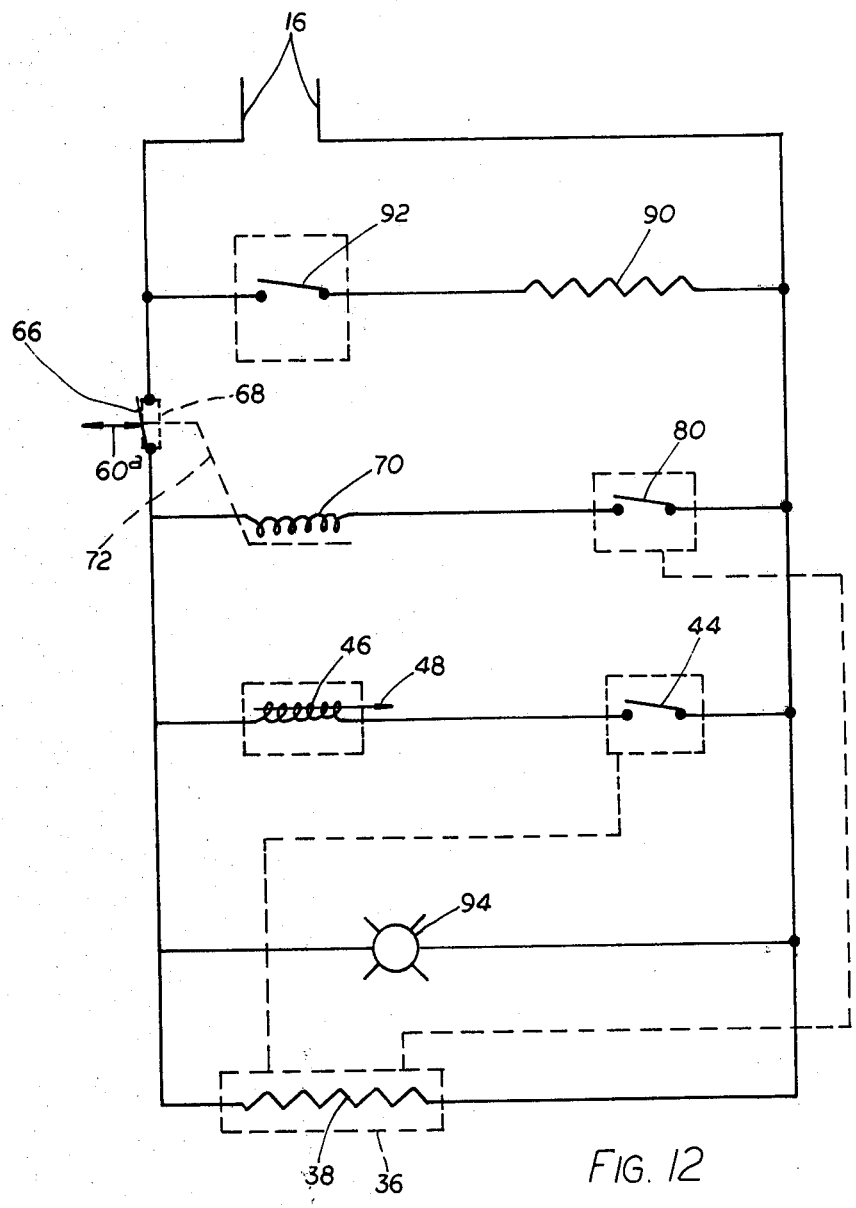
FIG. 12 is a schematic wiring diagram of the electrical circuit of the coffee maker.

FIG. 13 shows a modified coffee maker 10a of the invention and this coffee maker includes a coffee making area 18a wherein a coffee receiving receptacle 24a is positioned. Water is received in a reservoir 30a and discharges through a resilient tube 41a as in the other embodiment of the invention disclosed. Again, this tube 41a is resilient and is closed after gravity flow of water through this tube 41a to fill a suitable container 36a. The container 36a is designed to receive a measured volume, such as one cup of water therein. The chamber 36a has a vent tube 42a connecting thereto and extending up to the top of the reservoir 30a. Hence, when water flows from the reservoir 30a down through the tube 41a to the container, it will only flow until the container is full and water rises in the vent tube up to the level of that in the reservoir and likewise water in a discharge tube 52a will only flow up to this level.

Naturally the volumes of water received in the vent tube 42a and the discharge tube 52a as well as a heating tube later described herein are taken into consideration in determining the size or volume of the water received in the chamber 36a and the desired volume of coffee to be made. This action in terminating flow of water to the chamber 36a is done by a shut-off or control arm or lever 60a pushing a portion of this resilient tube 41a against a fixed member or portion of the housing as desired, all in the same manner as described hereinbefore, when the apparatus is started on an operative cycle.

Figure 14:
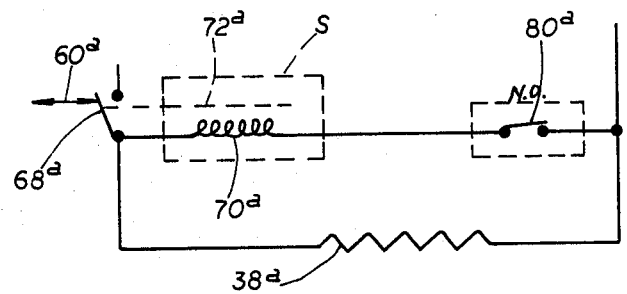
FIG. 14 is a schematic wiring diagram of control electric circuit means for the apparatus of FIG. 13.

By checking the details shown in FIGS. 13 and 14, it is seen that the control arm 60a controls a switch 68a that is operatively associated with the apparatus. Such switch 68a controls power supply to the heater coil 38a provided in the apparatus, and this heater coil encloses a metal tube 100 that receives water from the chamber 36a by flowing through a one way check valve 102 that permits water to pass in a direction indicated. Hence, when the coffee maker is actuated by moving or closing or actuating the control arm 60a to close the switch 68a, the heater 38a is actuated and at that time the tube 100 is full of water. The water in the tube 100 is rapidly heated by the heater coil 38a and as steam is formed in such localized or confined water volume, the steam forces the water to flow upwardly of the discharge tube 52a and be discharged into the coffee making area 18a. Naturally, when that steam is generated, it endeavors to flow back up through the valve 102 and this action is prevented, but when the steam has forced the water in the tube 100 to be exhausted therefrom, then an additional volume of water will flow downwardly through the check valve 102 into the tube 100 for renewed batch heating of this small confined volume of water. Hence, the heating and pumping cycles are repeated with each batch of water released from the chamber 36a through the valve until the chamber 36a has no water therein. Next, the coil 38a will heat the tube 100 to a relatively high temperature. To prevent excessive heating in the apparatus, a high temperature sensor or thermostat 80a is provided in operative association with the heater tube 100. This thermostat closes at about 190° F. Such action thus energizes the operative coil 70a of the solenoid to retract its armature. When unenergized, the solenoid armature 72a is biased axially outwardly to extend in under the rear end or a shoulder portion of the fulcrum arm 60a and retain the arm in circuit closing position when the front end of this arm is depressed. Thus, such unenergized solenoid 70a prevents downward movement of the rear end of the arm and maintains the tube 40a closed. When this solenoid is actuated, however, the solenoid armature is pulled back into the solenoid coil and disengages from the control arm 60a to permit the resiliency in the tube 40a to open the same again and likewise open the spring controlled switch 68a whereby power supply to the heater 38a is terminated and water can flow down into the chamber 36a and associated means for a repeat cycle of coffee making in accordance with the invention.

The coffee makers of the invention could, if desired, be used in other places than in vehicles, since the coffee makers are self-contained units that can use any conventional power supply that can be varied by a suitable transformer or other means to operate at the voltage and current level for which the coffee maker of the invention is constructed. The coffee makers could be positioned on any suitable support and power would be supplied to the power contacts of the coffee maker.

In freezing conditions, the device would be safe to use and operate since built in anti-freeze heating circuits are provided. Or, if desired, the entire unit could be removed from the vehicle and be moved indoors during extreme cold conditions. All water could be poured out of the coffee maker as another safety procedure and the unit then need not be reconnected to its power supply circuit until a coffee making action is desired.

The apparatus of the invention is believed to be very efficient and effective in operation, the frame or housing of the apparatus can be made from plastic, an effective control action is provided in the coffee making action, a self-contained water supply is provided, and safeguards are built in the units to prevent improper operation of the apparatus. Thus, the objects of the invention have been achieved.

While two complete embodiments of the invention have been disclosed herein, it will be appreciated that modification thereof may be resorted to without departing from the scope of the invention.

What is claimed is:

1. In an electric coffee maker, a water reservoir, a heating chamber means of smaller capacity than said reservoir, a water supply line connecting the reservoir to the heating chamber means, a heater for liquid in said heating chamber means, means enabling flow of water by gravity from said reservoir to said chamber means; a control circuit including a control switch to control power supply to the coffee maker and to said heater, and
   a thermostatically controlled shut-off means operatively connected to said control switch for operation of the same and shut off power to the coffee maker when said heating chamber is at an excessive temperature; and
   a lever or control arm pivotally positioned in the coffee maker to contact and close said control switch to start a coffee producing cycle, a flexible water supply tube operatively connecting said reservoir and heating chamber means, and said lever arm contacts and seals said water supply tube when moved to switch closing position.

2. In a coffee maker as in claim 1, a vent tube having a resilient section therein for said heating chamber, and a solenoid means operatively controlling an armature member engageable with said resilient section to close said vent tube.

3. In an electric coffee maker, a water reservoir, a heating chamber means of smaller capacity than said reservoir, a water supply line connecting the reservoir to the heating chamber means, shut-off means at one portion of said water supply means to control water flow through said water supply means, a heater for liquid in said heating chamber means, means enabling flow of water by gravity from said reservoir to said chamber means; a water chamber provided in said water supply line downstream from said portion thereof, a unidirectional valve means in said water supply line between said water chamber and said heating chamber means to permit flow to said heating chamber means from said water chamber but to close and not allow flow in a reverse direction, said heating chamber means being of appreciably smaller volume than said water chamber, and means connecting said heating chamber means to a coffee making area for discharge of heated water to such area by a heat pump action, the apparatus being adapted to heat small quantities of water individually at said heating chamber means to discharge such quantities individually to said coffee making area until all liquid in said water chamber has flowed to said heating chamber means, and has been heated and pumped to the coffee making area.

4. In a coffee maker including a frame, a reservoir, a heating chamber of smaller capacity than said reservoir, a water supply line including a resilient section connecting the reservoir to the heating chamber, and a heater for said heating chamber, a coffee making area being present, the combination comprising
   a control switch to control power supply to the coffee maker and to said heater,
   water in said heating chamber being heat pumped out of the same to flow to said coffee making area,
   a thermostatically controlled shut-off means operatively connected to said control switch to shut off power to the coffee maker when said heating chamber reaches an excessive temperature; a manually operated lever means fulcrumed on said frame for compressing said resilient means to prevent flow of water from said reservoir to said heating chamber when said heater is energized; and
   a solenoid means to engage said lever means and retain it in compressing engagement with said resilient means.

5. In an electric coffee maker, a water reservoir, a heating chamber means of smaller capacity than said reservoir, a water supply line connecting the reservoir to the heating chamber means, a heater for liquid in said heating chamber means, means enabling flow of water by gravity from said reservoir to said chamber means; a control circuit including
   a control switch to control power supply to the coffee maker and to said heater, and
   a thermostatically controlled shut-off means operatively connected to said control switch for operation of the same and shut off power to the coffee maker when said heating chamber means is at an excessive temperature;

said control switch including a control device, a lever arm pivotally positioned in the coffee maker to contact said contact device and close said control switch, and means operatively and electrically connected to said control switch to retain said lever arm in control switch closing position until a temperature rise causes said shut-off means to be actuated; and a solenoid having a spring projected, power retracted armature that engages said lever arm to retain it operative, said armature being energized by said shut-off means energization to retract from engaging said lever arm and enable spring release thereof.

* * * * *